United States Patent [19]
Lashier, Jr. et al.

[11] Patent Number: 5,727,299
[45] Date of Patent: Mar. 17, 1998

[54] WHEEL ALIGNMENT MACHINE AND METHOD

[75] Inventors: Frank E. Lashier, Jr., Sterling Heights; John F. Kinnick, Troy; Harold Hernden, Capac; Glen Harm, Fraser, all of Mich.

[73] Assignee: Dominion Tool & Die Company, Inc., Roseville, Mich.

[21] Appl. No.: 668,863

[22] Filed: Jun. 24, 1996

[51] Int. Cl.⁶ .................................... B23P 19/06
[52] U.S. Cl. .......................... 29/407.2; 29/407.04; 29/720
[58] Field of Search .................. 53/271, 273, 720, 53/721, 407.01, 407.02, 407.03, 407.04, 407.05

[56] References Cited

U.S. PATENT DOCUMENTS

| | | | |
|---|---|---|---|
| 4,104,778 | 8/1978 | Vliet | 29/407.03 |
| 4,179,786 | 12/1979 | Eshghy | 29/407.02 X |
| 4,620,450 | 11/1986 | Yamaguchi | 29/407.03 X |
| 4,841,632 | 6/1989 | Namiki et al. | 29/823 X |
| 5,027,275 | 6/1991 | Sakamoto et al. | 29/273 X |
| 5,065,494 | 11/1991 | Ebihaa et al. | 29/407.03 |
| 5,105,519 | 4/1992 | Doniwa | 29/407.02 |
| 5,321,506 | 6/1994 | Sargent | 29/407.03 X |
| 5,335,556 | 8/1994 | Mogilnicki | 29/721 X |
| 5,442,845 | 8/1995 | Callender | 29/407.05 |

*Primary Examiner*—Daniel Moon
*Attorney, Agent, or Firm*—Harness, Dickey & Pierce, P.L.C.

[57] ABSTRACT

An improved method and apparatus for setting the toe-in on motor vehicles during assembly thereof is disclosed which includes a sensor assembly operative to accurately sense the position of a nut runner prior to torquing of a locking jam nut so as to thereby ensure the full desired torque loading is applied to the jam nut. The method includes the step of rotating the nut runner in a reverse direction a predetermined distance subsequent to ascertaining its position so as to provide a distance of travel to assure alignment of the wrenching surfaces of the nut runner and jam nut.

19 Claims, 4 Drawing Sheets

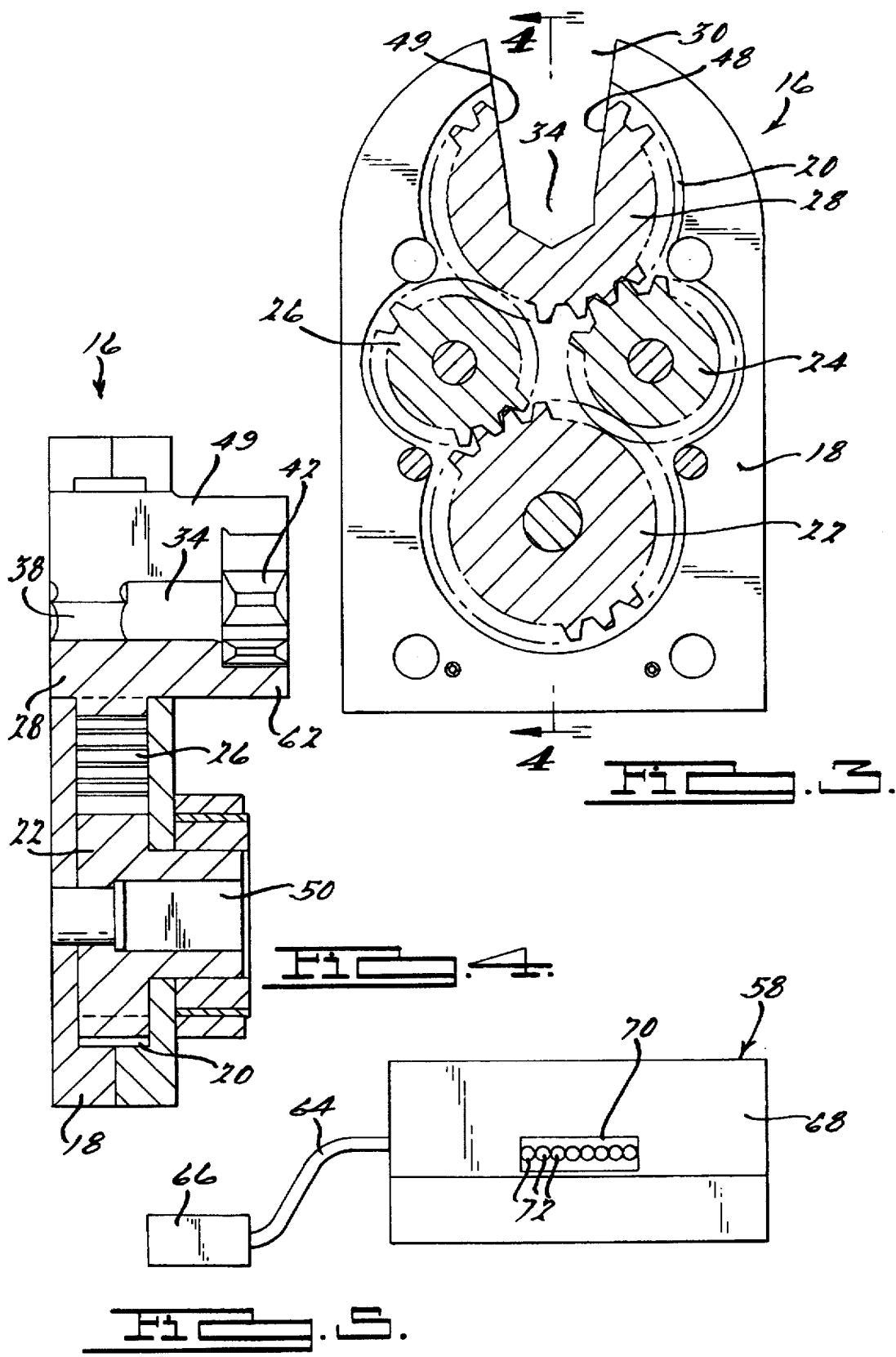

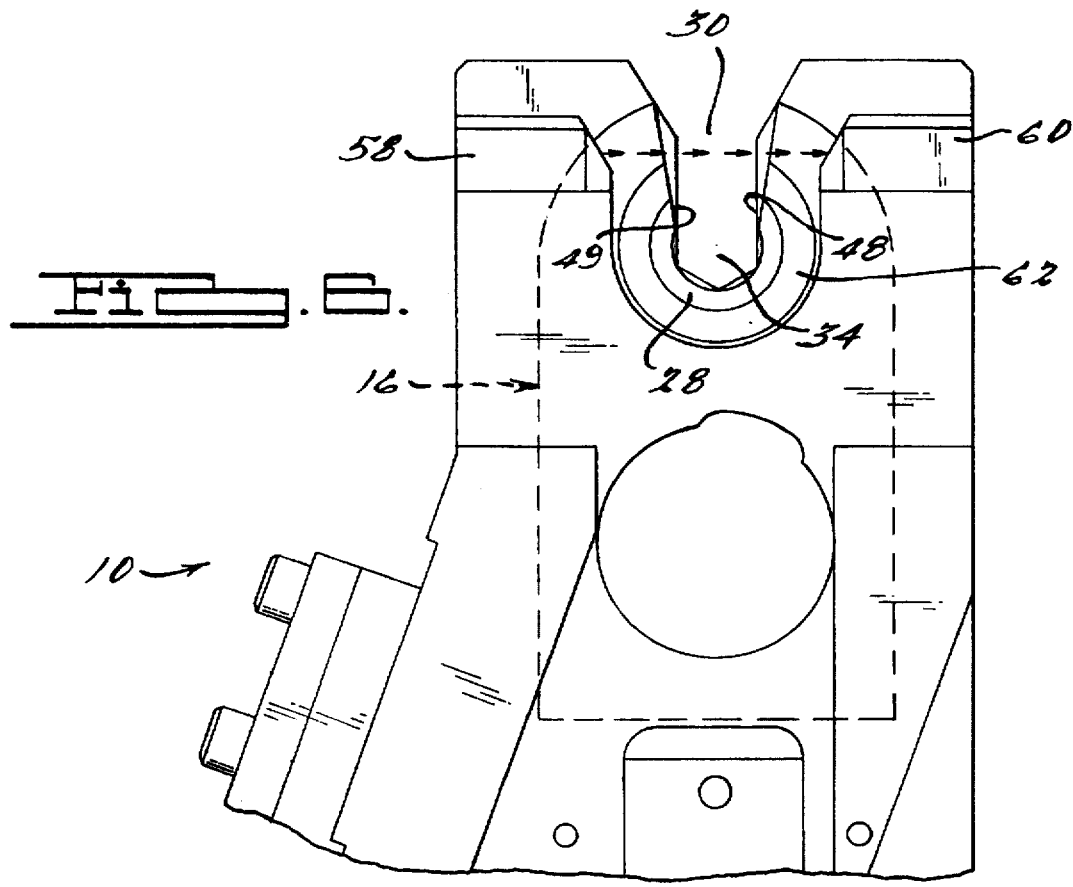
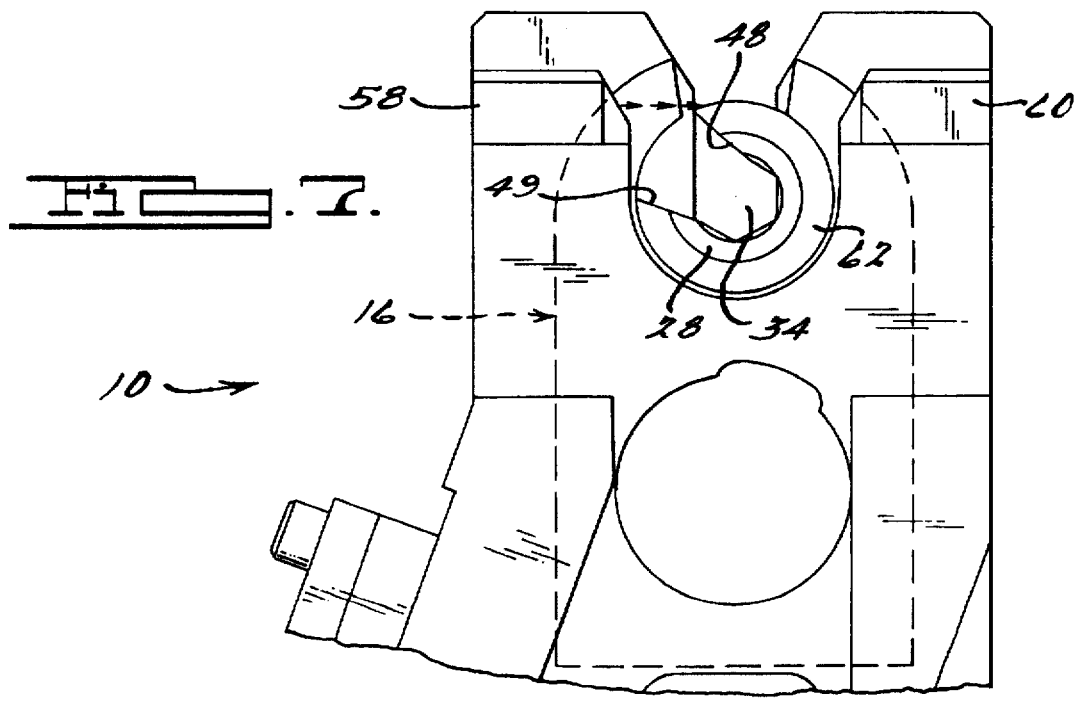

WHEEL ALIGNMENT MACHINE AND METHOD

BACKGROUND AND SUMMARY OF THE INVENTION

The present invention relates generally to alignment machines for automatically setting the front end alignment on motor vehicles and more specifically to apparatus and a method for automatically accurately setting the toe-in on vehicles in an assembly line environment.

In assembling of motor vehicles, one of the last operations that must be performed on the vehicle is the proper adjustment of the toe-in angle for the front wheels and securing the adjustment means in the desired position. Various types of apparatus have been developed to accomplish this task, however, these prior devices have not been totally satisfactory in accomplishing same. In particular, in systems utilizing a threaded connection and associated jam nut between the tie rod and outer tie rod end, it is extremely important that the jam nut be tightened to a predetermined torque level to ensure the toe-in remains in the set position during vehicle operation.

The present invention overcomes these problems by providing a method and apparatus for carrying out the method which ensures that the jam nut will be torqued to the desired level on each and every vehicle regardless of the number of revolutions or partial revolutions required to tighten same.

The present invention employs a unique optical sensor to accurately determine the position of the nut runner prior to final torquing of the jam nut. Thereafter an overrun adjustment is made whereupon the nut runner is moved into engagement with the jam nut and the jam nut is tightened to the desired torque level. Because the precise position of the nut runner is determined prior to engagement of the nut runner with the jam nut for final torquing, it is possible to ensure balanced driving engagement between the nut runner and the two associated drive gears thus avoiding any binding of the nut runner which binding could result in erroneous indication that the proper torque level had been reached.

The optical sensor arrangement employed in the present invention is specifically designed to accommodate the adverse working conditions encountered by such apparatus.

Additional advantages and features of the present invention will become apparent from the subsequent description and the appended claims taken in conjunction with the accompanying drawings.

BRIEF DESCRIPTION OF THE DRAWINGS

FIG. 3 is a section view of the nut runner assembly forming a part of the apparatus of the present invention;

FIG. 4 is a section view of the nut runner assembly of FIG. 3, the section being taken along line 4—4 thereof;

FIG. 5 is a front view of an optical sensor forming a part of the apparatus of the present invention; and FIGS. 6 and 7 are side-views of a portion of the apparatus illustrated in FIG. 2.

DESCRIPTION OF THE PREFERRED EMBODIMENT

Figure 1:
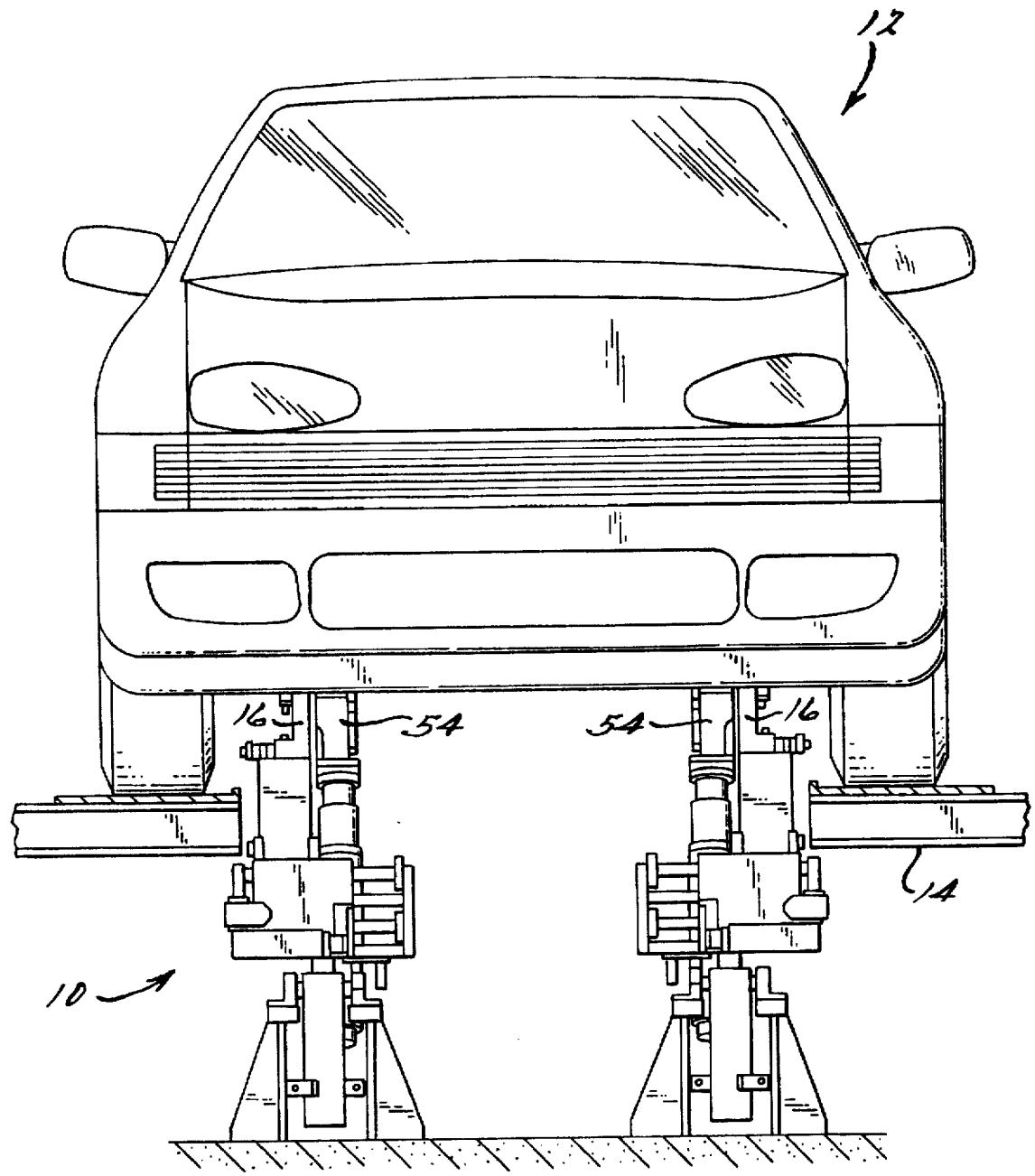
FIG. 1 is an elevational view showing a vehicle in an assembly line station at which the toe-in is being set utilizing the apparatus and method of the present invention.

Referring now to the drawings and in particular to FIG. 1, there is shown apparatus indicated generally at 10 for setting the toe-in on an assembled motor vehicle 12 as it progresses along an assembly line 14. As shown, apparatus 10 is positioned along opposite sides of motor vehicle 12 and is designed to move upwardly to engage each of the tie rods associated with the front steering assembly of the vehicle so as to properly adjust the toe-in for the motor vehicle. Apparatus 10 is designed to effect the mechanical adjustment of the vehicle toe-in in response to other sensing and/or measuring equipment the operation of which is well known and does not form a part of the present invention.

Figure 2:
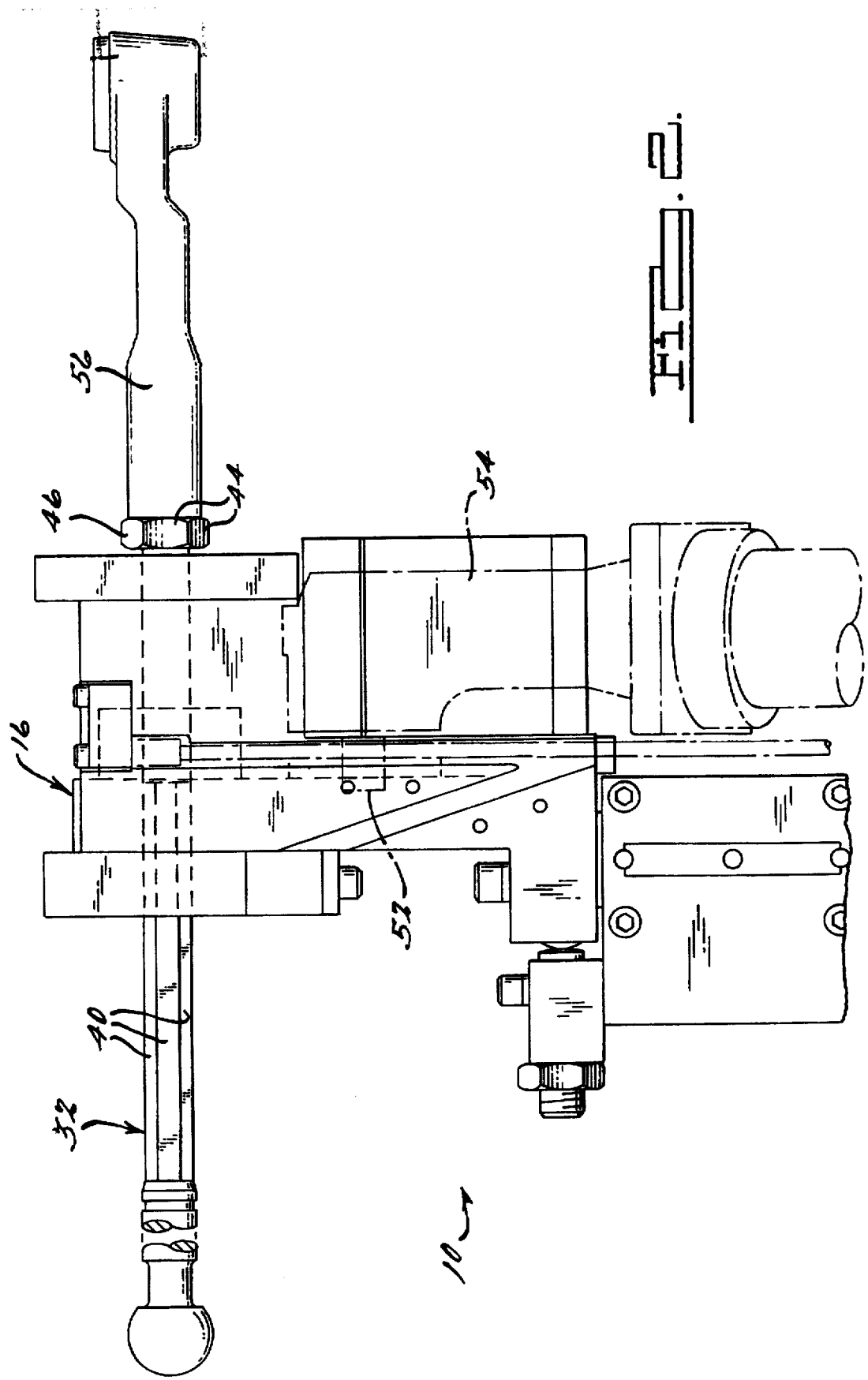
FIG. 2 is an enlarged fragmentary view of a portion of the toe-in setting apparatus of FIG. 1 shown in operative relationship to a tie rod of a motor vehicle.

As best seen with reference to FIGS. 2–4, apparatus 10 includes a nut runner assembly 16 secured to the upper end thereof. Nut runner assembly 16 includes a housing 18. Housing 18 defines a substantially enclosed cavity 20 within which a drive gear 22 is rotatably supported. A pair of pinion gears 24, 26 are also rotatably supported in meshing engagement with drive gear 22 and serve to rotatably drive a nut runner gear 28 also rotatably supported within housing 18. Housing 18 also includes an outwardly opening slot 30 at the upper end thereof which is adapted to enable it to receive tie rod 32 forming a part of the vehicle steering system.

Nut runner gear 28 includes an opening 34 extending axially therethrough, one end of which is provided with suitably sized axially extending wrenching surfaces 38 to enable it to engage complementary wrenching surfaces 40 provided on the vehicle tie rod 32. The other axial end of nut runner gear 28 extends outwardly from housing 18 and has wrenching surfaces 42 provided in that end of opening 34. As shown in FIG. 2, the wrenching surfaces 40 provided on tie rod 32 extend along only a portion thereof terminating short of jam nut 46 which is threadedly engaged with the outer end of tie rod 32. Preferably the distance between the end of wrenching surfaces 40 and jam nut 46 will be greater than the axial width of nut runner gear 28 and the intermediate portion of tie rod 32 will be of a reduced diameter such that nut runner gear may be positioned such that it can be freely rotated without wrenching surfaces 38 engaging wrenching surfaces 40 or wrenching surfaces 42 engaging wrenching surfaces 44 of jam nut 46. A radially outwardly extending segmented slot defined by slightly diverging sidewalls 48 and 49 is provided in nut runner gear 28 opening to the outer periphery thereof and adapted to enable it to receive the vehicle tie rod 32 via slot 30 in housing 18.

Drive gear 22 includes a square opening 50 extending axially inwardly which is adapted to receive a complementary shaped drive member 52. Drive member 52 is designed to be rotatably driven by suitable drive means such as for example a DC motor drive 54 although other suitable drive means may be used such as for example a pneumatic or hydraulic motor.

In operation, apparatus 10 will operate to move nut runner assembly 16 upwardly so that tie rod 32 is received within the segmented slotted opening of nut runner gear 28 once vehicle 12 has been properly positioned within the work station. Thereafter, nut runner assembly 16 will be moved axially along tie rod 32 so as to move wrenching surfaces 42 into engagement with jam nut 46 whereupon drive means 54 will rotatably drive nut runner gear 28 via drive gear 22 and pinion gears 24 and 26 to thereby back jam nut away from engagement with tie rod end 56.

Next, apparatus 10 will move nut runner assembly 16 in the opposite axial direction so as to move wrenching surfaces 42 out of engagement with jam nut 46 and bring wrenching surfaces 38 into engagement with wrenching surfaces 40 provided on tie rod 32. At this point, nut runner gear will be rotatably driven to thereby rotate tie rod 32 to set the toe-in. Suitable sensors and control means will control operation of nut runner gear 28 so as to assure the proper direction of rotation of tie rod as well as the number of turns required to achieve the required setting for the vehicle. Similar operations are performed on both sides of the vehicle.

Once the proper toe-in has been set, apparatus 10 will operate to again move nut runner assembly 16 axially along tie rod 32 so as to move wrenching surfaces 38 out of engagement with tie rod wrenching surfaces 40 to an intermediate idle position and thereafter to move wrenching surfaces 42 into engagement with jam nut 46. Nut runner gear 28 will then be rotatably driven to drive jam nut 46 into engagement with tie rod end 56 and then tighten same to a predetermined torque level to thereby lock the toe-in adjustment in position.

In prior apparatus of this type, it has not been possible to determine the angular position of nut runner gear 28 at the point in time at which jam nut engages tie rod end 56. As a result, in many cases, nut runner gear 28 will have its slotted opening positioned in aligned relationship with one or the other of pinion gears 24 and 26 at the point in time at which it is desired to ensure jam nut 46 has been torqued to a predetermined level. Thus, the torquing forces will be supplied to nut runner gear 28 via only one of the two pinion gears 24, 26, the other pinion gear being out of engagement with the teeth on the nut runner gear 28 due to the slotted opening therein. It has been found that under these conditions, the torquing forces may cause a binding or cocking of nut runner gear 28 such that the full desired torque loading is not applied to jam nut 46.

In order to overcome this problem, the nut runner assembly 16 of the present invention is designed to be moved axially out of engagement with the jam nut 46 and into a middle idle position once the jam nut 46 has been driven into engagement with the tie rod end 56. In this position, neither of the two wrenching surfaces 38 and 42 are engaged and thus the nut runner gear 28 is free to rotate about the tie rod 32. At this point, the nut runner gear is rotated to a position in which the sidewalls 48 and 49 of the slotted opening provided therein are substantially aligned with the respective sidewalls defining slotted opening 30 in the housing 18 as shown in FIG. 6.

In order to determine that the nut runner gear 28 is oriented in this position, a sensor assembly comprising a light source 58 and associated receiver 60 are provided being mounted on opposite sides of the axially outwardly projecting portion 62 of the nut runner gear 28. As shown in FIGS. 6 and 7, the light source 58 and receiver 60 are positioned at a location relative to the axially projecting portion 62 of the nut runner gear 28 such that when the slotted opening defined by sidewalls 48 and 49 in the nut runner gear 28 is aligned with the sidewalls of the slotted opening 30 in the housing 18, receiver 60 will sense light being emitted from the adjacent light source 58 as shown in FIG. 6. However, as shown in FIG. 7, when the opening defined by sidewalls 48 and 49 is out of alignment with slotted opening 30 of housing 18, the peripheral surface of nut runner gear 28 will effectively block the light transmission from source 58 to receiver 60. In this manner, it is possible to accurately determine the position of the nut runner gear.

Preferably light source 58 will be in the form of a suitable multi-stranded fiber optic cable 64 extending from a suitable remotely located light generator 66. As shown in FIG. 5, the emitting end of the fiber optic cable will be connected to a suitable enclosure 68 having a generally elongated rectangular shaped window 70 therein. The individual strands 72 of the multi-strand fiber optic cable will be arranged in side-by-side relationship so as to substantially fill the entire length of the window 70. It has been found that by so arranging the strands 72 of fiber optic cable 64, greater reliability in operation is achieved because the light source is spread over a larger area and hence less susceptible to failure due to accumulation of dirt, grease and other light blocking debris. Similarly, the receiver 60 will be disposed in a housing having sensing window of a corresponding shape such that even were a substantial portion of the rectangularly shaped array of the light source 58 or sensing window of the receiver 60 to be obscured by dirt, a sufficient signal will be generated and received so as to indicate the proper positioning of the nut runner gear 28. The reception of light from source 58 by receiver 60 will result in a signal being sent to a remote controller indicating desired positioning of nut runner gear 28.

Returning now to the method of operation of the present invention as previously mentioned, the nut runner gear 28 is positioned such that sidewalls 48 and 49 are positioned in substantially aligned relationship with the sidewalls defining slotted opening 30. Next, the drive gear 22 is rotated so as to drive nut runner gear 28 a predetermined distance in a direction that would loosen or back off jam nut 46 from engagement with tie rod end were the wrenching surfaces 42 engaged therewith. Preferably, the predetermined distance will be approximately 60°. Because the jam nut 46 has the wrenching surfaces arranged in a hexagonal array, the use of 60° for the predetermined distance ensures that the wrenching surfaces 42 will be moved to a position to engage the jam nut 46 at least by the time the slotted portion of nut runner gear 28 has moved into alignment with slotted opening 30. Additionally, even given a maximum rotation of the nut runner gear 28 of just under 60° to engage jam nut 46, there will still remain a substantial distance of rotation to ensure proper torquing before the open portion of nut runner gear will be in a position such that the other pinion gear will not be meshingly engaged therewith. Thus, the 60° predetermined distance ensures that both pinion gears 24 and 26 are engaged with nut runner gear 28.

Once the nut runner gear has rotated the predetermined distance, apparatus 10 will move the nut runner assembly 16 axially along the tie rod 32 to move the wrenching surfaces 42 into engagement with the jam nut 46 whereupon rotational movement of the nut runner gear 28 will cause wrenching surfaces 42 thereof to move into an aligned position and engage wrenching surfaces 44 of jam nut 46. Thereafter, continued rotation of nut runner gear 28 will operate to finish tightening jam nut 46 and ensure the predetermined desired torque loading is applied thereto thus locking the toe-in setting for the vehicle. It should be noted that because the jam nut 46 had been previously moved into engagement with the tie rod end 56, movement to the full desired torque loading on the jam nut 46 will result in only a relatively small angular rotation thereof. Thus, the repositioning of nut runner gear 28 prior to final torquing of the jam nut 46 will ensure that the nut runner gear 28 is fully engaged with and being driven by both pinion gears throughout the final torquing operation. This prevents possible cocking of nut runner gear and thus ensures that substantially the full torque loading being applied by the drive means will be transmitted to the jam nut.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. Improved apparatus for setting toe-in on a motor vehicle, said motor vehicle including a tie rod having wrenching surfaces extending along a portion thereof, a tie rod end threadedly connected to said tie rod and a jam nut threaded on said tie rod and operative to be torqued into engagement with said tie rod end to lock said tie rod and tie rod end in a predetermined position, said apparatus comprising:

a nut runner assembly including a housing having a slotted opening therein adapted to receive said tie rod;

a nut runner rotatably disposed within said housing, said nut runner including a segmented opening adapted to receive said tie rod and first and second axially spaced wrenching surfaces adapted for engagement with said wrenching surfaces of said tie rod and wrenching surfaces of said jam nut;

support apparatus for movably supporting said nut runner assembly for reciprocable movement whereby said nut runner is movable into and out of a position in which said tie rod is received within said segmented opening and axial movement along said tie rod;

said support apparatus including a drive system for rotatably driving said nut runner in first and second directions; and a sensor mounted on said support apparatus, adjacent said nut runner, said sensor being operative to sense the position of said nut runner during a portion of its rotational movement.

2. Improved apparatus as set forth in claim 1 further including a controller operatively connected to said sensor, said sensor supplying a signal to said controller indicative of said nut runner being in a predetermined position.

3. Improved apparatus as set forth in claim 2 wherein said predetermined position is a position in which said segmented opening is aligned with said slotted opening.

4. Improved apparatus as set forth in claim 2 wherein said controller is operative to rotate said nut runner in one of said first and second directions a predetermined distance in response to said signal from said sensor.

5. Improved apparatus as set forth in claim 4 wherein said sensor is an optical sensor.

6. Improved apparatus as set forth in claim 5 wherein said sensor comprises a light source mounted on said support apparatus adjacent one side of said nut runner and a receiver mounted on said support apparatus adjacent the other side of said nut runner.

7. Improved apparatus as set forth in claim 6 wherein said light source comprises a fiber optic cable for transmitting light from one end to said light receiver when said nut runner is in said predetermined position, the other end of said fiber optic cable extending to a remote light source.

8. Improved apparatus as set forth in claim 7 wherein said fiber optic cable comprises a plurality of strands, said strands being arranged in a laterally extending side-by-side relationship at said one end.

9. Improved apparatus for applying a predetermined torque to a jam nut whereby relative rotation between first and second threadedly connected members is prevented, said jam nut being threaded on said first member, said apparatus comprising:

a housing having a slotted opening at one end thereof adapted to receive said first member;

a nut runner rotatably disposed within said housing, said nut runner having a segmented opening alignable with said slotted opening for receiving said first member, said nut runner including an axially extending wrenching surface adapted to engage said jam nut;

a sensor supported adjacent said nut runner and operative to sense when said nut runner is in a predetermined position; and a drive system for rotatably driving said nut runner in first and second directions.

10. Improved apparatus as set forth in claim 9 wherein said predetermined position is when said segmented opening of said nut runner is in aligned relationship with said slotted opening in said housing.

11. Improved apparatus as set forth in claim 10 wherein said sensor includes a signal transmitter and a signal receiver, said signal transmitter and signal receiver being mounted adjacent said nut runner such that a signal transmitted by said signal transmitter is received by said signal receiver when said segmented opening is in said predetermined position and said nut runner blocks transmission of said signal from said signal transmitter to said signal receiver when said nut runner is in a position other than said predetermined position.

12. Improved apparatus as set forth in claim 11 wherein said signal transmitter comprises a fiber optic cable having a plurality of strands, said fiber optic cable having one end supported adjacent said nut runner and a second end connected to a power source, said plurality of strands being arranged in a laterally extending side-by-side relationship at said one end.

13. Improved apparatus as set forth in claim 12 wherein said nut runner includes gear teeth on the periphery thereof and said drive system includes first and second spaced pinion gears rotatably supported in said housing and engageable with said gear teeth and a drive gear rotatably supported within said housing and drivingly engaging said first and second pinion gears and a motor operatively connected to said drive gear.

14. Improved apparatus as set forth in claim 13 further comprising a controller operative to receive a signal from said signal receiver indicative of said nut runner being in said predetermined position and wherein said controller operates to rotate said nut runner a predetermined distance in a first direction in response to a signal from said signal receiver, to thereafter move said wrenching surfaces of said nut runner into engagement with said jam nut and to rotate said nut runner in a second direction to thereby apply a predetermined torque to said jam nut, said predetermined distance being selected so as to ensure both said first and second pinion gears are engaged with said gear teeth on said nut runner when said predetermined torque is applied to said jam nut.

15. A method for ensuring a predetermined torque is applied to a jam nut in an assembly in which a first member is threadedly connected to a second member, said jam nut being threaded on said first member and movable into engagement with said second member to secure said first and second member in a preselected relative position, said method comprising:

moving a nut runner assembly including a housing having a slotted opening and a nut runner rotatably supported in said housing, said nut runner having wrenching surfaces adapted to engage said jam nut and a segmented opening, into a position in which said first member is received within said segmented opening through said slotted opening;

positioning said first and second member in said preselected position;

moving said nut runner assembly axially along said first member to bring said wrenching surfaces into engagement with said jam nut;

rotatably driving said nut runner in a first direction to move said jam nut into engagement with said second member;

moving said nut runner assembly axially along said first member to move said wrenching surfaces out of engagement with said jam nut;

rotating said nut runner;

sensing when said nut runner is in a first predetermined position;

rotating said nut runner in a second direction a predetermined distance from said predetermined position;

moving said nut runner assembly axially along said first member to bring said wrenching surfaces into engagement with said jam nut;

rotating said nut runner in said first direction to thereby apply a predetermined torque to said jam nut whereby said first and second members are secured in said preselected position.

16. A method as set forth in claim 15 wherein said nut runner assembly includes first and second pinion gears drivingly engageable with gear teeth provided on said nut runner, one or the other of said pinion gears moving out of engagement with said gear teeth of said nut runner as said segmented opening moves past said pinion gear, said method further comprising selecting said predetermined distance so as to ensure said first and second pinion gears both engage said gear teeth on said nut runner as said predetermined torque is applied to said jam nut.

17. A method as set forth in claim 15 wherein said sensing step comprises receiving a signal transmitted across said segmented opening when said nut runner is in said predetermined position.

18. A method as set forth in claim 17 further comprising blocking receipt of said signal when said nut runner is in a position other than said predetermined position.

19. A method as set forth in claim 15 further comprising moving said nut runner assembly axially along said first member to bring second wrenching surfaces provided on said nut runner into engagement with wrenching surfaces provided on said first member, rotating said nut runner to position said first member in said preselected position.

* * * * *